United States Patent [19]

Fox et al.

[11] 4,176,097
[45] Nov. 27, 1979

[54] ASBESTOS-FREE TAPE SEALANT

[75] Inventors: Roy A. Fox, Medford, N.J.; Bradford T. Mortimer, Wheaton, Ill.

[73] Assignee: Standard Oil Company (Indiana), Chicago, Ill.

[21] Appl. No.: 899,720

[22] Filed: Apr. 25, 1978

[51] Int. Cl.$^2$ .............................................. C08L 1/02
[52] U.S. Cl. ...................... 260/17.4 BB; 260/17.4 CL
[58] Field of Search ................ 260/17.4 CL, 17.4 BB; 428/355

[56] References Cited
FOREIGN PATENT DOCUMENTS 690333  4/1953  United Kingdom ..................... 428/356

OTHER PUBLICATIONS

Chem. Absts., vol. 72:13625u, Self-Adherent Butyl Rubber Tape for Pipeline Protection, Asfazadourian.
Chem. Abst., vol. 80:16158v, Rubber Sealants, Hamano et al.
Chem. Absts., vol. 80:146,854e, Stringlike Elastic Sealing Materials, Komatsu et al.
Chem. Absts., vol. 80:146,855e, Butyl Rubber—Sealing Agents—Adhesive Tapes, Hoshii et al.

*Primary Examiner*—Edward M. Woodberry
*Attorney, Agent, or Firm*—Wallace L. Oliver; Arthur G. Gilkes; William T. McClain

[57] ABSTRACT

An asbestos-free sealant composition comprises cotton fiber, amorphous polypropylene and butyl rubber incorporated into a base stock comprising an inorganic filler and a suitable binder.

15 Claims, No Drawings

ASBESTOS-FREE TAPE SEALANT

BACKGROUND OF THE DISCLOSURE

This invention relates to sealants and more specifically to sealant compositions which are asbestos-free.

Asbestos incorporated into sealant systems is well-known in the industry. One such system, incorporating asbestos, is preformed sealant tape which can be used in applications such as a bedding and face glazing compounds which make seals to such substrates as metals, glass, ceramics and plastics. Typically, such asbestos-based sealant tape uses a base stock containing an inorganic filler such as calcium carbonate and a suitable binder such as a polybutene or a mixture of polybutene and polyisobutylene. Formulations of filler, binder and asbestos vary according to a specific application. For example, a bedding compound useful in forming metal to metal bonds such as those produced in the manufacture of mobile homes, typically uses only polybutene as a binder. However, a high quality tape sealant, useful in the automotive industry, which needs greater bond strength, good aging properties and the ability to adhere to porous and nonporous substrates typically contains, as a binder, substantial quantities of polyisobutylene together with polybutene.

Because of environmental and health problems associated with asbestos, there is an immediate need in the sealant industry for asbestos-free sealant systems which have good sealant properties and which can be manufactured at reasonable cost. Systems incorporating substantial amounts of butyl rubber will perform adequately, but generally are commercially unacceptable because of high cost. It is an object of our invention to produce an asbestos-free sealant system which demonstrates adequate sealant properties at reasonable cost.

SUMMARY OF THE INVENTION

This invention comprises an asbestos-free sealant composition comprising cotton fiber, amorphous polypropylene, butyl rubber, an inorganic filler and a suitable binder.

BRIEF DESCRIPTION OF THE INVENTION

The sealant system of this invention is based on a combination of cotton fiber, amorphous polypropylene, and butyl rubber. This combination can be used as a replacement for asbestos in sealant systems in which asbestos is incorporated into base stock comprising an inorganic filler and a suitable binder.

Cotton fibers useful in this invention are predominantly cotton with fiber lengths ranging up to about 0.25 inch and can be bleached, unbleached or dyed. Preferable cotton fibers range in length from about 0.01 to about 0.1 inch. An especially preferable cotton fiber mixture contains about 98% cotton random cut into fibers with lengths ranging from about 0.015 to about 0.04 inches.

The amorphous polypropylene useful in this invention is a predominantly propylene homopolymer which does not show substantial crystallinity and which has a viscosity at 375° F. between about 200 to about 1800 centipoises. Typically, amorphous polypropylene is soluble in liquid hydrocarbons such as hexane.

"Butyl rubbers" useful in this invention are solid, rubbery polymers of isobutylene containing about 1½ to 4½% isoprene. Generally, useful butyl rubbers have a Mooney viscosity ranging from about 40 to 65. A preferable butyl rubber contains about 1½ to 2% isoprene and has a Mooney viscosity of about 55. A too low viscosity butyl rubber will have little strength while a too high viscosity butyl rubber will be too tough such that the rubber will not disperse with the other components of this invention when mixed.

The preferable butyl rubber useful in this invention is partially cross-linked butyl rubber in which about 25 to 75% of the potential cross-linking sites are actually cross-linked. An especially preferable butyl rubber is about 50% cross-linked. Unvulcanized butyl rubber is too tacky which results in handling problems in sealant compositions, while higher cross-linked butyl rubber has little tack which results in loss of sealant characteristics. A butyl rubber solution containing unvulcanized butyl rubber and mineral spirits is not preferable because of staining problems.

The polybutenes useful as a binder in the base stock in our invention are a series of butylene polymers with viscosities ranging from about 200 to 1000 centipoises, preferably 625 to 675 centipoises, at 210° F. comprising predominantly (85–98%) of mono-olefins with the balance being isoparaffins. Typically, these polymers are made by polymerizing a butene feedstock, which is rich in isobutylene, with a metal halide catalyst. Mainly, the polymer backbone resembles polyisobutylene, but can contain 1- and 2-butenes, especially in lower molecular weight material. The mono-olefins comprising the main part of these polybutenes predominantly are dimethyl substituted terminal olefins with only minor amounts of vinylidene and terminal vinyl structures. Some internal double bonds probably exist, but are difficult to characterize. These polybutenes are chemically stable, permanently fluid liquids with moderate to high viscosity which are essentially water-white. These polymers are miscible at 20° C. with all hydrocarbon solvents, with chlorohydrocarbons such as carbontetrachloride, chloroform and trichloroethylene, with ethers such as diethylether and with esters such as n-butylacetate. They are insoluble at 20° C. with water, ethyl alcohol, isopropyl alcohol, acetone, methyl ethyl ketone and glacial acetic acid, but are partially soluble in n-butyl alcohol.

The "polyisobutylenes" useful in a binder in this invention typically are formed by depolymerizing butyl rubber. Typically, such polyisobutylenes are predominantly straight-chained, unbranched polymers of isobutylene having a viscosity average molecular weight ranging from about 20,000 to about 50,000, preferably about 35,000 to about 45,000. An especially preferable polyisobutylene useful in a binder in high quality sealants of this invention has a viscosity average molecular weight of about 35,000, unsaturation of about 4.2 mole % and a specific gravity of about 0.92.

As used in this specification the terms "polybutenes," "butyl rubber," and "polyisobutylene" are described above by their various physical characteristics, although all three substances generally can be described as isobutylene polymers. These compounds further are described in the Encyclopedia of Polymer Science and Technology, Vol. 2, John Wiley & Sons, 1965, pp. 754–795, and the references cited therein, all incorporated by reference herein.

The fillers useful in the base stock in our invention are inorganic compounds with good oil absorbency characteristics and particle size distribution which permit a homogeneous product when mixed with the other components useful in this invention. Preferably, the filler has a low cost. Examples of suitable fillers include calcium carbonate, magnesium silicates, talc (especially platelet talc), diatomaceous silica, and clay. Calcium carbonate is the most preferable filler. Also preferable is a mixture of inorganic filler such as calcium carbonate and diatomaceous silica, and calcium carbonate, diatomaceous silica, and clay (hydrous alumina silicate). Typically, suitable fillers should be particulate such that about 70% of the particles will pass through a 325 mesh screen. A filler formulation is chosen to have adequate oil retention while maintaining sufficient adhesion to substrates. Although neither preferred nor recommended, minor amounts of asbestos can be included within compositions of this invention.

Minor amounts up to about 7 wt. % of other substances may be incorporated within compositions of this invention including biocides, wetting agents such as soya fatty acid and oleic acid, colorants, and pigments such as titanium dioxide.

Together with a base stock, compositions of our invention contain about 2 to about 20 wt. % cotton fiber, about 1 to about 10 wt. % amorphous polypropylene, and about 0.5 to about 25 wt. % butyl rubber. A preferable composition of our invention contains about 4 to about 8 wt. % cotton fiber, about 4 to about 7 wt. % amorphous polypropylene, and about 1 to about 5 wt. % butyl rubber.

As a base stock, compositions of our invention contain about 30 to about 80 wt. %, preferably about 30 to about 55 wt. %, filler; about 15 wt. % to about 40 wt. %, preferably about 20 to about 33 wt. %, polybutene; and 0 to about 20 wt. % polyisobutylene. An especially suitable composition of our invention contains as filler, about 30 to about 55 wt. % calcium carbonate and about 2 to about 10 wt. % diatomaceous silica. A preferable composition of our invention contains, as filler, about 30 to about 55 wt. % calcium carbonate, about 2 to about 10 wt. % diatomaceous silica, and about 7 to about 20 wt. % clay. Another preferable composition of our invention contains about 40 to about 50 wt. % calcium carbonate, about 3 to about 7 wt. % diatomeceous silica, and about 12 to about 18 wt. % clay.

A preferable high quality sealant of this invention contains about 20 to about 33 wt. % polyisobutylene together with suitable quantities of polybutene, filler, cotton fiber, amorphous polypropylene and butyl rubber. A typical formulation would contain about 4 to about 15 wt. % cotton fiber, about 2 to about 8 wt. % amorphous polypropylene, about 3 to about 15 wt. % butyl rubber, about 15 to about 25 wt. % polybutene, about 20 to about 33 wt. % polyisobutylene and about 30 to about 65 wt. % inorganic filler. Preferably, the inorganic filler comprises calcium carbonate. Other preferable formulations can contain calcium carbonate, platelet talc, clay and diatomaceous silica. Typical formulations contain about 15 to about 40 wt. % calcium carbonate, about 1 to about 5 wt. % diatomaceous silica, and about 3 to about 16 wt. % talc or clay. An especially preferable high quality sealant formulation comprises about 6 wt. % cotton fiber, about 5 wt. % amorphous polypropylene, about 12 wt. % partially cross-linked butyl rubber, about 18 wt. % polybutene, about 24 wt. % polyisobutylene, about 20 wt. % calcium carbonate, about 3 wt. % diatomaceous silica and about 12 wt. % platelet talc. Typically, 0 to about 2.5 wt. % titanium dioxide is included in these compositions as a pigment.

Various formulations were tested in an attempt to find an acceptable asbestos-free sealant. Wood cellulose, ground wood fiber, and cotton fiber were used as replacement fibers for asbestos in sealant compositions containing polybutene and calcium carbonate. Wood cellulose and ground wood fiber were unable to promote "length" to the sealants and poor oil absorbency of their fiber permitted excessive oil migration. However, cotton fiber-based sealants had acceptable appearance adhesion and oil migration properties, but still lacked the degree of length normally found in asbestos-based sealants. The term "length" as used in the tape sealant art is the ability of a tape to elongate when stretched instead of breaking. An effective tape sealant should have sufficient length such that the tape can be applied to a surface without breaking. Incorporation of amorphous polypropylene with cotton fiber in a sealant composition solved the length problem, but these sealants had insufficient adhesion to pass a low temperature flexibility test. A relatively small amount of butyl rubber introduced into a cotton fiber/amorphous polypropylene-based system yielded sealants with excellent adhesion and low temperature flexibility. Cotton fiber-based systems containing butyl rubber without amorphous polypropylene were overly tacky and could not be extruded easily into preformed tapes.

The following examples demonstrate but do not limit this invention.

Examples I–IV

An asbestos-free sealant composition of this invention and an asbestos containing control composition were compounded using the ingredients listed in Table I. The ingredients were added in a sigma blade mixer in the order listed and then the entire mass allowed to mix for one additional hour. The resulting sealant composition was extruded into a tape and tested. The results of such tests, shown in Table II, demonstrate that the sealant compositions of this invention are acceptable substitutes for an asbestos-containing system.

TABLE I

| Ingredients (wt. %) | A | I | II | III | IV |
| --- | --- | --- | --- | --- | --- |
| Polybutene (1) | 31.75 | 25.77 | 25.34 | 25.34 | 24.01 |
| Amorphous polypropylene | — | 8.60 (2) | 8.44 (2) | 8.44 (2) | 5.05 (3) |
| Butyl rubber-solution (4) | — | 1.72 | — | — | — |
| Butyl rubber-partially (5) cross-linked | — | — | 3.38 | — | 1.72 |
| Butyl rubber-unvulcanized (6) | — | — | — | 3.38 | — |
| Soya fatty acid - wetting agent | 0.54 | 0.34 | 0.34 | 0.34 | — |
| Asbestos (7) | 31.75 | — | — | — | — |
| Clay (8) | — | — | — | — | 16.37 |
| Calcium carbonate (9) | 31.75 | 51.55 | 50.68 | 50.68 | 44.05 |
| Cotton fiber (10) | — | 12.02 | 11.82 | 11.82 | 4.8 |

TABLE I-continued

| Ingredients (wt. %) | A | I | II | III | IV |
|---|---|---|---|---|---|
| Diatomaceous silica (11) | 4.21 | — | — | — | 4.0 |

(1) Amoco H-300 (viscosity - 627-675 CS at 210° F.)
(2) Hercules AFAX 500-HL-O
(3) Amoco 20-600A
(4) Permalox 8017 (50—50 blend-unvulcanized butyl rubber and mineral spirits)
(5) Cities Service BUCAR 5214 (about 50% cross-linked; Mooney viscosity - 55)
(6) Exxon Butyl 065 (unvulcanized; Mooney viscosity - 55)
(7) Asbestos 7M-5 (short fiber)
(8) Snobrite (av. particle size - 5 microns; oil adsorption - 30 lbs./100 lbs.)
(9) Atomite (av. particle size - 2.5 microns; oil adsorption - 16 lbs./100 lbs.)
(10) Filfloc S/60-900 (fiber length - 0.015-0.040 inch)
(11) Celite 281 (av. particle size - 7.3 microns; oil adsorption - 110 lbs./100 lbs.)

TABLE II

| Test Results | A | I | II | III | IV |
|---|---|---|---|---|---|
| Adhesion after Impact | 0 | 0 | 0 | 0 | 0 |
| % Adhesion Loss (ASTM C-766) | | | | | |
| Low Temp. Flex | 0 | 0 | 0 | 0 | 0 |
| % Adhesion Loss (ASTM C-765) | | | | | |
| Oil Migration | 1.13 | 1.75 | 1.25 | 1.25 | 1.75 |
| Stain Index (ASTM C-772) | | | | | |
| Weight Loss % | 0.98 | 1.62 | 1.09 | 1.06 | 1.59 |
| (ASTM C-771) | | | | | |
| Softness, 0.1 mm with 50g. load | 63 | 117 | 92 | 87 | 85 |
| (ASTM C-782) | | | | | |
| Slump | pass | pass | pass | pass | pass |
| (ASTM D-2376) | | | | | |
| Effect of Weathering (1) | | | | | |
| (ASTM D-2249) | | | | | |
| Face Glazing | | | | | |
| (300 hrs.) | | | | | |
| Surface Cracking | 4-5 | 4 | 4 | 4-5 | 4-5 |
| Deep Bead Cracking | 5 | 4-5 | 4-5 | 5 | 5 |
| Loss of Adhesion | 5 | 4 | 4 | 4 | 4-5 |
| Wrinkling | 4-5 | 4 | 4 | 4 | 5 |
| Oil Exudation | 5 | 5 | 5 | 5 | 4-5 |
| Bedding Compound | | | | | |
| (300 hrs.) | | | | | |
| Surface Cracking | 5 | 4 | 4-5 | 4-5 | 4 |
| Deep Bead Cracking | 5 | 4-5 | 5 | 4-5 | 5 |
| Loss of Adhesion | 5 | 4 | 4 | 4-5 | 4 |
| Wrinkling | 4-5 | 4-5 | 4 | 4-5 | 4 |
| Oil Exudation | 5 | 5 | 5 | 5 | 4-5 |

(1) Scale for Weathering Effect
1 - severe effect
2 - considerable effect
3 - moderate effect
4 - slight effect
5 - no effect

We claim:

1. A sealant composition comprising the following components:

| Component | Approximate wt. % Range |
|---|---|
| cotton fiber (up to 0.25 inch) | 2–20 |
| amorphous polypropylene (200–1800 centipoises) | 1–10 |
| butyl rubber (Mooney vicosity 40–65) | 0.5–25 |
| inorganic filler | 30–80 |
| polybutene (200–1000 centipoises) | 15–40 |
| polyisobutylene (molec. wt. 20,000–50,000) | 0–40 |

2. The sealant composition of claim 1 wherein the inorganic filler comprises calcium carbonate.

3. The sealant composition of claim 1 wherein the inorganic filler comprises mixture of calcium carbonate and diatomaceous silica.

4. The sealant composition of claim 1 wherein the inorganic filler comprises a mixture of calcium carbonate, diatomaceous silica, and clay.

5. The sealant composition of claim 1 wherein the butyl rubber is partially cross-linked butyl rubber.

6. A sealant composition of claim 1 which contains about 4 to about 8 wt. % cotton fiber, to about 4 to about 7 wt. % amorphous polypropylene, about 1 to about 5 wt. % butyl rubber, about 20 to about 33% polybutene, and about 30 to about 55 wt. % inorganic filler.

7. The sealant composition of claim 6 wherein the inorganic filler comprises about 30 to about 55 wt. % calcium carbonate and about 2 to about 10 wt. % diatomaceous silica.

8. The sealant composition of claim 6 wherein the inorganic filler comprises about 30 to about 55 wt. % calcium carbonate, about 2 to about 10 wt. % diatomaceous silica and about 2 to about 20 wt. % clay.

9. The sealant composition of claim 8 wherein the inorganic filler comprises about 40 to about 50 wt. % calcium carbonate, about 3 to about 7 wt. % diatomaceous silica and about 12 to about 18 wt. % clay.

10. A sealant composition of claim 1 which contains about 5 wt. % cotton fiber, about 5 wt. % amorphous polypropylene, about 2 wt. % partially cross-linked butyl rubber, about 24 wt. % polybutene, about 44 wt. % calcium carbonate, about 4 wt. % diatomaceous silica and about 16 wt. % clay.

11. A sealant composition of claim 1 which contains about 4 to about 15 wt. % cotton fiber, about 2 to about 8 wt. % amorphous polypropylene, about 3 to about 15 wt. % butyl rubber, about 30 to about 65 wt. % inorganic filler, about 15 to about 25 wt. % polybutene and about 20 to about 33 wt. % polyisobutylene.

12. The sealant composition of claim 11 wherein the inorganic filler comprises calcium carbonate.

13. The sealant composition of claim 11 which contains about 6 wt. % cotton fiber, about 5 wt. % amorphous polypropylene, about 12 wt. % partially cross-linked butyl rubber, about 35 wt. % inorganic filler, about 18 wt. % polybutene and about 24 wt. % polyisobutylene.

14. A sealant composition of claim 13 which contains about 20 wt. % calcium carbonate, about 3 wt. % diatomaceous silica and about 12 wt. % platelet talc.

15. An extruded tape formed from the sealant compositions of claim 1, 2, 3, 4, 5, 6, 7, 8, 9, 10, 11, 12, 13, or 14.

* * * * *